April 28, 1964   A. G. ANDREA   3,130,554
REFRIGERATING AND AIR CONDITIONING APPARATUS
Filed April 2, 1963

INVENTOR.
ANDREW G. ANDREA
BY
*Dunlap, Laney & Hubbard*
ATTORNEYS

United States Patent Office 3,130,554
Patented Apr. 28, 1964

3,130,554
REFRIGERATING AND AIR CONDITIONING
APPARATUS
Andrew G. Andrea, 6801 NW. 59th Terrace, Bethany,
Okla., assignor of one-half to Mildred M. Kennedy,
Parsons, Kans.
Filed Apr. 2, 1963, Ser. No. 270,012
9 Claims. (Cl. 62—7)

This invention relates to a refrigerating and air conditioning apparatus employing a normally liquid, volatile fuel as the refrigerant. More particularly, but not by way of limitation, the present invention relates to a refrigeration or air conditioning system which is well-adapted for utilization in an automobile and which may be operated using the gasoline fuel of the automobile as the refrigerant in the refrigeration system of the invention.

Numerous efforts have been made heretofore to provide an efficient and reliable system for providing refrigeration in automobiles, which systems employ the fuel used to supply the internal combustion engine of the automobile as the refrigerant in the system. Such systems have, of course, commonly depended upon a change in the physical state of the fuel to effect the desired degree of cooling and this has most frequently been accomplished by passing the fuel into some sort of a cooling or refrigeration coil where it is expanded from the liquid to the gaseous state, thereby adsorbing from the environment of the cooling coil the necessary heat of vaporization to undergo such conversion.

In some of the more recently developed systems, such as those described in United States Patents 3,027,727 to Farmer and 2,872,790 to Simpson et al., the refrigeration system proposed depends upon the development of a vacuum in the cooling coils of the refrigeration system by connection of these coils to the intake manifold of the internal combustion engine used to drive the automobile.

While the refrigeration systems proposed by Farmer and Simpson et al. have performed well under certain conditions of operation of the automobile, the system has not been sufficiently versatile to permit it to operate efficiently and without detriment to the operation of the engine of the automobile when the automobile is driven at varying altitudes and is operated in different climates or under different temperature conditions. In both the Farmer and Simpson et al. structures, the air which is mixed with the gasoline in the refrigerating coils is supplied in a constant amount and is directly proportional to the amount of vacuum pulled from the intake manifold of the internal combustion engine. No provision is made for altering or varying this supply of air according to the particular needs of the engine when the automobile is operated at higher altitudes where the air is cooler and contains a lesser amount of oxygen. As a result, the engine of the automobile does not operate efficiently at such altitudes when the refrigeration system is in use and fuel is therefore supplied at least in part to the engine after being passed through the refrigeration system and therein vaporized and mixed with air to provide a mixture of air and fuel for injection into the cylinders of the engine.

Moreover, in systems of the type heretofore devised, while it has been recognized that some criticality attaches to the diametric sizes of the various conduits used for conducting the gasoline and air into and through the refrigeration coils of the system and for mixing these components in the refrigeration system, it is my conclusion after considerable testing of refrigeration systems similar in some respects to those proposed by Farmer and Simpson et al. that the diametric sizes of the conduits and mixing zones which these parties have proposed are not the optimum sizes. It is thus one aspect of the present invention that improvement in the efficiency of the refrigeration system constituting the invention is achieved from the use of more nearly optimum sizes for conveying the several fluids into the refrigerating coils of the system, and for there effecting the evaporation of the fuel and the mixing of the fuel with air prior to conducting it to the internal combustion engine.

The present invention may be summarized as comprising in a broader sense, an elongated, generally tubular cooling coil having first and second closed ends; a second coil of smaller diameter than the cooling coil passing into the cooling coil at or adjacent one of its ends and extending through a major portion of the length of the cooling coil, the second coil being connected at one of its ends to a source of a volatile, normally liquid fuel or refrigerant; a source of vacuum connected to the same end of the cooling coil that is entered by the second coil; a tubular conduit of smaller diameter than the tubular coil passing into the second end of the cooling coil and terminating with its end which is inside the cooling coil in spaced relation to the end of the second coil which extends inside the cooling coil; and valve means connected to the end of the tubular conduit which is outside the cooling coil for adjusting the amount of air drawn into the cooling coil through the tubular conduit as a result of the application of vacuum to the cooling coil. It will readily be perceived that the thus broadly described refrigeration system of the present invention differs from the refrigeration systems of Farmer and Simpson et al. in providing a control valve for controlling the amount of air which is introduced to the refrigeration system for mixing with the fuel refrigerant used therein, and thereby permits the system to function effectively and without detriment to the operation of the automobile regardless of seasonal or climatic changes, and regardless of the elevation at which the automobile is operated. The geometrical configuration and the dimensions of the various elements used in the refrigeration system of the present invention are selected to provide highly efficient refrigeration and I have found that I am able to lower the temperature in the immediate vicinity of the refrigerating coil by 40° C. in a period of 5 minutes utilizing the present invention.

From the foregoing description of the invention, it will be apparent that it is a major object of the invention to provide an improved and versatile refrigeration system which utilizes a normally liquid, volatile fuel, such as gasoline, as the refrigerating or heat exchange medium.

An additional object of the present invention is to provide an air conditioning system which may be easily incorporated in an automobile and which will employ the fuel normally used by the automobile as the heat exchange medium.

A further object of the present invention is to provide an automobile refrigeration system which is operated using the fuel normally used to power the automobile, and which functions effectively at varying altitudes without detrimentally affecting the efficient operation of the engine of the automobile at such varying altitudes.

Another object of the present invention is to provide an automobile refrigeration system which is not detrimentally affected by climatic or seasonal changes.

Yet another object of the present invention is to provide a refrigeration system which is very simple in construction, yet is mechanically rugged and characterized by a long and trouble-free operating life.

In addition to the foregoing described objects and advantages of the invention, additional objects will become apparent from, or will be expressly set forth in, the following detailed description of the invention and in the accompanying drawings which illustrate the invention.

Figure 1:
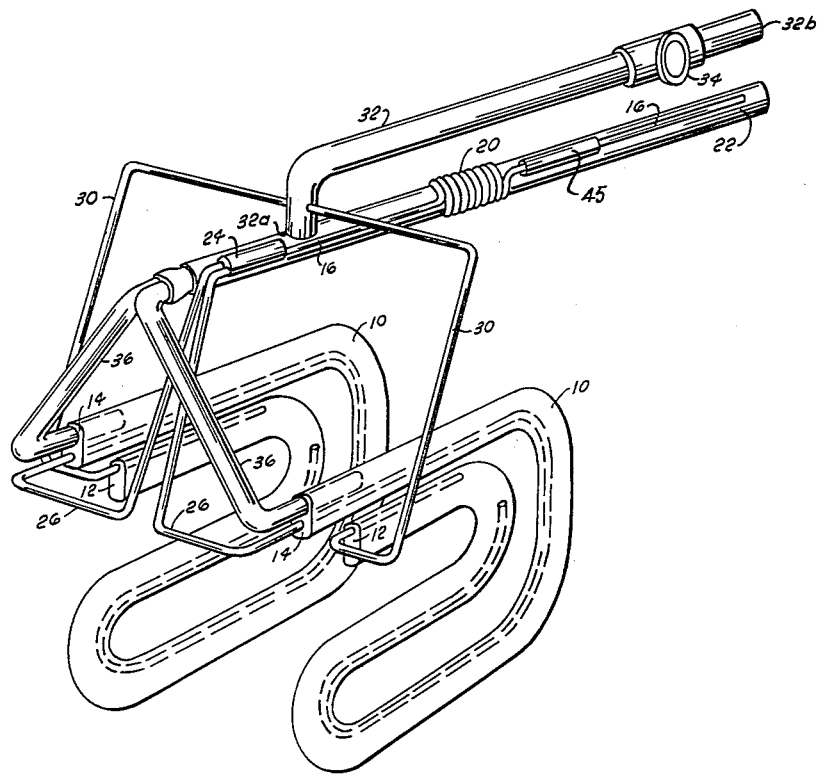
FIGURE 1 is a perspective view of one embodiment of the present invention.

Referring now to the drawings in detail and particularly to FIGURE 1, a pair of refrigeration coils 10 are provided in the embodiment of the invention illustrated in FIGURE 1. The refrigeration coils 10 are preferably wound in tortuous convolutions in the substantially monoplanar form illustrated in FIGURE 1 and are parallel to and spaced from each other. The refrigeration coils 10 are preferably, though not necessarily, formed of ½-inch copper tubing which is flattened into an oval or ellipsoid cross-sectional configuration as illustrated. The ends 12 and 14 of the refrigeration or cooling coils 10 are closed.

The refrigerant material which is employed is conveyed into the cooling coils 10 by a small conduit 16 which is preferably about $28/1000$-inch in inside diameter. The refrigerant intake conduit 16 is formed in a series of heat exchange convolutions 20 which surround a vacuum conduit 22. The vacuum conduit 22 is adapted for connection to a suitable source of vacuum, such as the intake manifold of the internal combustion engine of an automobile. From the heat exchange convolutions 20, the refrigerant intake conduit 16 passes into a divider coupling or fitting 24 where the stream of refrigerant is split to two conduits 26 passing into the closed ends 14 of the cooling coils 10. The conduits 26 are also preferably about $28/1000$-inch in inside diameter. The refrigerant intake conduits 26 are sealingly engaged by the closed ends 14 of their respective cooling coils 10 and after passing into the cooling coils 10 extend throughout a major portion of the length of the cooling coils as indicated in dashed lines in FIGURE 1 of the drawings. Preferably, the portions of the conduits 26 inside the cooling coils 10 extend from the closed ends 14 of the cooling coils to a point which is relatively closely adjacent the other closed ends 12 of the cooling coils.

In order to attain a combustible mixture of air and fuel so that the fuel used as the refrigerant may further be used in an internal combustion engine, a pair of air intake conduits 30 which are preferably about ⅛-inch in inside diameter are provided which convey air from an air intake manifold 32 into each of the cooling coils 10 via the closed ends 12 thereof. The air intake manifold 32 preferably is constructed of a short length of $5/16$-inch inside diameter tubing and is provided with a control valve 34 for controlling the amount of air which passes into the air intake manifold 32. In one embodiment of the invention, the air intake manifold 32 may be conveniently supported or fixed to the vacuum conduit 22 by brazing one of its ends 32a thereto. The opposite end 32b of the air intake manifold 32 is open to permit air to enter therein. The air intake conduits 30 pass into the air intake manifold 32 adjacent the end 32a thereof and, as previously indicated, also pass into the closed ends 12 of the cooling coils 10. Preferably, the air intake conduits 30 terminate with their ends inside the cooling coils 10 spaced a relatively short distance from the ends of the refrigerant intake conduits 26 inside the cooling coils 10.

In order to provide a vacuum in the cooling coils 10, a pair of vacuum tubes 36 which are preferably about $5/16$-inch in inside diameter extend into a closed end of the vacuum conduit 22 and terminate with their opposite ends inside the cooling coils 10. The vacuum lines 36 are approximately $5/16$-inch inside diameter tubing and are sealed in the closed ends 14 of the cooling coils 10.

In the operation of the refrigeration system of the invention, the refrigerant intake conduit 16 is connected to a suitable source of a volatile, normally liquid refrigerant which can serve, when mixed in suitable proportion with air, as a fuel for an internal combustion engine or the like. The vacuum conduit 22 is connected to a suitable source of vacuum which may comprise either an electrically or gasoline powered vacuum pump, or the intake manifold of an internal combustion engine of the type utilized in automobiles. The air intake manifold 32 of the refrigeration system is opened at its end 32b to the air, and the amount of air drawn through the manifold 32 into the air intake conduits 30 is controlled by the control valve 34 positioned in the air intake manifold.

The liquid refrigerant is passed through the refrigerant intake conduit 16 and is lowered considerably in temperature by its passage through the heat exchange convolutions 20 which encircle the vacuum conduit 22 carrying a cool mixture of air and fuel toward the source of vacuum. This pre-cooling avoids pre-vaporization of the refrigerant in hot weather or tropical climates. The cooled refrigerant is then passed through the conduits 26 into the cooling coils 10. Inside the cooling coils 10, the liquid refrigerant continues to move in the relatively small diameter conduits 26 until the ends of these conduits are reached at points which are relatively close to the opposite ends of the cooling coils. At these points the liquid refrigerant moving in the conduits 26 is permitted to expand into the larger confinement of the cooling coils 10 and in such expansion is converted from the liquid to the gaseous state. The heat of vaporization of the refrigerant is absorbed from the surrounding environment to yield the desired refrigerating effect. The vacuum induced in the cooling coil 10 as a result of the connection of the vacuum conduit 22 to a suitable source of vacuum, and the connection of the vacuum lines 36 to the closed ends 14 of the cooling coils reverses the direction of flow of the refrigerant in the cooling coil 10 and pulls the partially vaporized refrigerant back along that portion of the conduits 26 which are enclosed within the cooling coils. Thus, prior to being flashed to the gaseous state, the liquid refrigerant moving in the conduits 26 within the cooling coils 10 is pre-cooled by heat exchange with the countercurrently moving refrigerant which has been discharged from the ends of the conduits 26 inside the cooling coils.

As the refrigerant material is drawn through the cooling coils 10 by the vacuum applied to the vacuum conduit 22, the vacuum within the cooling coils 10 also induces air flow into and through the air intake manifold 32 and the air intake conduits 30. The air is introduced to the cooling coils 10 via the air intake conduits 30 and is mixed with the vaporized refrigerant at a locale which is intermediate the opposed ends of the air intake conduits 30 and the refrigeration conveying conduits 26. By proper adjustment of the control valve 34, the amount of air which is mixed with the refrigerant may be selected to provide a combustible mixture suitable for use in an internal combustion engine. Thus, by connecting the embodiment of the invention shown in FIGURE 1 to the internal combustion engine of an automobile in the manner illustrated in FIGURE 2, a mixture of gasoline and air may be discharged through the vacuum conduit 22 into the intake manifold of the engine with such mixture being sufficient to power the engine in a smooth and efficient manner.

Figure 2:
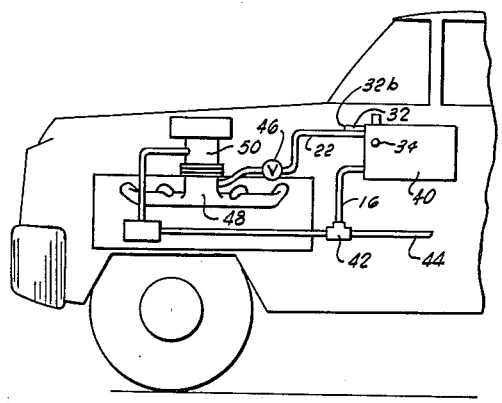
FIGURE 2 is a schematic illustration of the present invention as it is incorporated in an automobile in combination with the fuel supply system and the internal combustion engine of the automobile.
Figure 3:
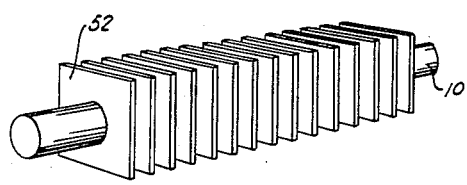
FIGURE 3 is a perspective view illustrating the manner in which the cooling or refrigeration coil of the present invention may be adapted to use as an air conditioning element.

When the refrigeration system of the invention is used in combination with the engine and fuel supply system of an automobile as shown in FIGURE 2, the cooling or refrigeration coils 10 of the system are enclosed within a suitable housing or cabinet 40 which is insulated in a manner well understood in the art to prevent dissipation of the cool air within the immediate vicinity of the cooling coils 10. The cabinet 40 is constructed to permit small items normally carried in an automobile during a trip or at other times, such as baby bottles, bottles of soft drinks, etc., to be stored in the cabinet and to be cooled by the refrigeration system of the present invention. In most instances, the cabinet can be conveniently positioned under the dashboard and adjacent the firewall of the automobile to facilitate easy access thereto by occupants of the front seat of the automobile.

The refrigerant intake conduit 16 is connected through a suitable fitting, such as the T coupling 42, to the fuel line 44 which conventionally extends between the engine and the gasoline tank (not seen) at the rear of the automobile. Preferably, a small choke or restrictive orifice 45 of about $11/1000$-inch in diameter is provided in the refrigerant intake conduit 16 to permit exactly the proper amount of gasoline to be drawn into the refrigeration coils 10. The choke 45 prevents too much gasoline being fed through the refrigeration system to the engine when the engine is idling and assures smooth and even idling of the engine when the refrigeration system is in use. The vacuum conduit 22 and air intake manifold 32 both extend forward from the cabinet 40 through the firewall of the automobile. The control valve 34 whiih is interposed in the air intake manifold 32 is accessible from the outside of the cabinet 40 to permit persons riding in the automobile to adjust the amount of air drawn into the refrigeration coils so that efficient refrigeration results and so that the efficient performance of the engine is not affected regardless of the altitude at which the automobile is operated. The vacuum conduit 22 is connected through a suitable valve 46 to the intake manifold 48 of the engine. The valve 46 permits the refrigeration system to be disconnected or isolated from the engine when not in use. When the refrigeration system of the invention is not in use and is isolated from the engine by closure of the valve 46, gas is drawn into the carburetor 50 from the fuel line 44 in the normal or conventional manner.

It is contemplated in a second embodiment of the invention to adapt the refrigeration system of the present invention to utilization as an air conditioning system by providing the cooling or refrigeration coils 10 with a plurality of closely spaced radially extending heat exchange fins 52 which permit the cool air surrounding the cooling coils to be radiated outwardly. As is well understood in the art, a suitable fan or blower (not shown) is normally positioned in juxtaposition to the radiating fins 52 and may be used to circulate the cool air through the interior of the vehicle, or in any other space where it is desired to lower the temperature.

It has been found that when the refrigeration system of the present invention is constructed in accordance with the foregoing description, utilizing the dimensions enumerated, and controlling the amount of air inducted into the refrigeration or cooling coils 10 via the air intake manifold 32, a highly efficient refrigerator is comprised by the cooling coils 10 in cabinet 40 and that the operation of the refrigeration system does not detrimentally affect the smooth and efficient performance of the automobile engine. In fact, I have observed that some increase in the efficiency of the engine may be achieved when the refrigeration system is operating in an optimum manner apparently as a result of the more complete and efficient mixing of air inducted into the refrigeration system with the fuel which provides the refrigerant used therein. The refrigeration system is capable of reducing the temperature in the cabinet 40° F. in 5 minutes when the system is connected to a source of vacuum which can pull at least 16.5 inches of mercury vacuum and using gasoline as the refrigerant. The system is normally self-defrosting and temperatures as low as −20° F. can be developed in the cabinet 40 using the system.

Although a number of modifications and innovations may be made in the precise structure depicted in the drawings and hereinbefore described, it is to be understood that these illustrations and the foregoing description are directed to but one exemplary embodiment of the invention and that such innovations and modifications are therefore to be expected and are well within the ability of those having ordinary skill in the art. Insofar as changes of this type do not require the exercise of inventive faculty and do not depart from the fundamental principles which underlie the present invention, such changes are deemed to be circumscribed by the spirit and scope of the invention except as the same may be necessarily limited by the appended claims or reasonable equivalents thereof.

I claim:

1. Refrigeration apparatus for utilizing the latent heat of vaporization of a volatile, normally liquid fuel to effect cooling comprising:
   (a) an elongated, generally tubular cooling coil having first and second closed ends;
   (b) a refrigerant intake coil of smaller diameter and lesser length than said first coil passing into said first coil adjacent the first end thereof and extending through a major portion of the length of said first coil, said refrigerant intake coil having its end outside said first coil connected to a source of said volatile, normally liquid fuel;
   (c) a source of vacuum connected to the first end of said cooling coil;
   (d) a tubular conduit of smaller diameter than said cooling coil passing into the second end of said cooling coil and terminating with its end inside said cooling coil in spaced relation to the end of said refrigerant intake coil in said cooling coil; and
   (e) valve means connected to the end of said tubular conduit outside said cooling coil for adjusting the amount of air drawn into said cooling coil through said tubular conduit by said source of vacuum.

2. Refrigeration apparatus as claimed in claim 1 wherein said source of vacuum is the intake manifold of an internal combustion engine and said source of volatile, normally liquid fuel is the fuel supply for said internal combustion engine.

3. Refrigeration apparatus as claimed in claim 1 and further characterized to include vacuum tubular conduit means connected between said source of vacuum and said cooling coil and wherein a portion of said refrigerant intake coil is disposed in convolutions around said vacuum tubular conduit means in heat exchange relation thereto.

4. Refrigeration apparatus as claimed in claim 1 and further characterized to include radial heat exchange fins around a portion of said cooling coil.

5. Refrigeration apparatus as claimed in claim 1 wherein said cooling coil is flattened to an oval cross-sectional configuration over a major portion of its length.

6. Refrigeration apparatus as claimed in claim 1 wherein said cooling coil is about ½-inch in inside diameter in circular cross-section, said refrigerant intake coil is about $28/1000$-inch in inside diameter, and said tubular conduit is about ⅛-inch in inside diameter.

7. Refrigeration apparatus as claimed in claim 6 and further characterized to include a restrictive orifice choke having an opening of about $11/1000$-inch therethrough interposed in said refrigerant intake coil.

8. A heat exchange device comprising:
   (a) a source of vacuum;
   (b) an elongated tubular member connected to said source of vacuum;
   (c) a pair of cooling coils coiled in parallel spaced planes and each closed at both ends thereof;
   (d) a tubular conduit connected between one end of each of the cooling coils and said tubular member to place said coils in communication with said tubular member whereby said coils may be evacuated;
   (e) a source of a volatile, normally liquid refrigerating material;
   (f) a tubular, refrigerating material intake line connected at one of its ends to said source of volatile, normally liquid refrigerating material;

(g) a pair of tubes of smaller diameter than said cooling coils connected to said tubular intake line and passing into said cooling coils at the ends thereof opposite the ends to which said tubular conduits are connected and extending inside said coils for a substantial portion of the length thereof;

(h) air intake conduits extending into each of said cooling coils at the ends thereof opposite the ends to which said tubular conduits are connected; and (i) air intake control means associated with said air intake conduits for controlling the amount of air introduced to said cooling coils via said air intake conduits.

9. In combination with an internal combustion engine having a carburetor and an intake manifold, and with a source of fuel for said engine and a fuel line connecting the source of fuel to the engine, a refrigeration system comprising:

(a) an elongated, generally tubular cooling coil having first and second closed ends;

(b) a fuel intake coil of smaller diameter than said cooling coil passing into said cooling coil adjacent the first end thereof and extending through a major portion of the length of said cooling coil, said fuel intake coil having its end outside said cooling coil connected to said fuel line between said source of fuel and said internal combustion engine;

(c) an air intake conduit of smaller diameter than said cooling coil passing into the second end of said cooling coil and terminating with its end inside said cooling coil in spaced relation to the end of said fuel intake coil in said cooling coil;

(d) a tubular conduit connecting the first end of said cooling coil with the intake manifold of said internal combustion engine whereby vacuum may be developed in said cooling coil when said internal combustion engine is running; and (e) valve means connected to the end of said air intake conduit outside said cooling coil for adjusting the amount of air drawn into said cooling coil through said air intake conduit by the vacuum developed in said cooling coil when said internal combustion engine is operating.

References Cited in the file of this patent

UNITED STATES PATENTS

| | | |
|---|---|---|
| 2,438,594 | Zaport | Mar. 30, 1948 |
| 2,755,639 | Straznicky | July 24, 1956 |